(12) United States Patent
Cox

(10) Patent No.: US 9,005,354 B1
(45) Date of Patent: Apr. 14, 2015

(54) FILTERLESS MATERIAL SEPARATOR

(75) Inventor: Donald G. Cox, Bargersville, IN (US)

(73) Assignee: Air Equipment & Engineering, Inc., Martinsville, IN (US)

( * ) Notice: Subject to any disclaimer, the term of this patent is extended or adjusted under 35 U.S.C. 154(b) by 479 days.

(21) Appl. No.: 13/472,898

(22) Filed: May 16, 2012

(51) Int. Cl.
  *B01D 51/00* (2006.01)
  *B01D 45/08* (2006.01)
  *B01D 45/02* (2006.01)
  *B01D 45/04* (2006.01)

(52) U.S. Cl.
  CPC ............. *B01D 45/08* (2013.01); *B01D 45/02* (2013.01); *B01D 45/04* (2013.01)

(58) Field of Classification Search
  CPC ......... B01D 45/08; B01D 45/02; B01D 45/04
  USPC ........... 55/418, 420, 467, 424, 426, 428, 429, 55/319; 96/372, 376, 379
  See application file for complete search history.

(56) References Cited

U.S. PATENT DOCUMENTS

| | | | |
|---|---|---|---|
| 2,838,131 A | 6/1958 | Peterson | |
| 2,935,158 A | 5/1960 | Braun | |
| 3,491,518 A | 1/1970 | Williams | |
| 3,646,595 A | 2/1972 | Williams | |
| 3,684,093 A * | 8/1972 | Kono et al. | 210/788 |
| 4,584,003 A | 4/1986 | Oda et al. | |
| 4,764,191 A | 8/1988 | Morelli | |
| 4,783,259 A | 11/1988 | Wade | |
| 4,915,714 A | 4/1990 | Teague et al. | |
| 5,480,465 A | 1/1996 | Cox | |
| 2004/0221717 A1 * | 11/2004 | Armstrong et al. | 95/26 |
| 2009/0272406 A1 * | 11/2009 | Miller | 134/18 |

FOREIGN PATENT DOCUMENTS

JP    60-100913    5/1988

* cited by examiner

*Primary Examiner* — Dung H Bui
(74) *Attorney, Agent, or Firm* — Woodard, Emhardt, Moriarty, McNett & Henry LLP

(57) ABSTRACT

A device for separating foreign material from air without the use of filters includes a chamber to receive the foreign material and air, an exhaust port and a pressure source that draws air from the chamber through the exhaust port, and an air inlet through which an additional quantity of air enters the chamber to move the foreign material away from the exhaust port so that the foreign material is not entrained in the exhaust air. A valve regulates the quantity of additional air introduced into the chamber through the air inlet. The exhaust port is positioned downstream of the air inlet. The foreign material collects in the dead air space of the receiving end of the chamber.

3 Claims, 1 Drawing Sheet

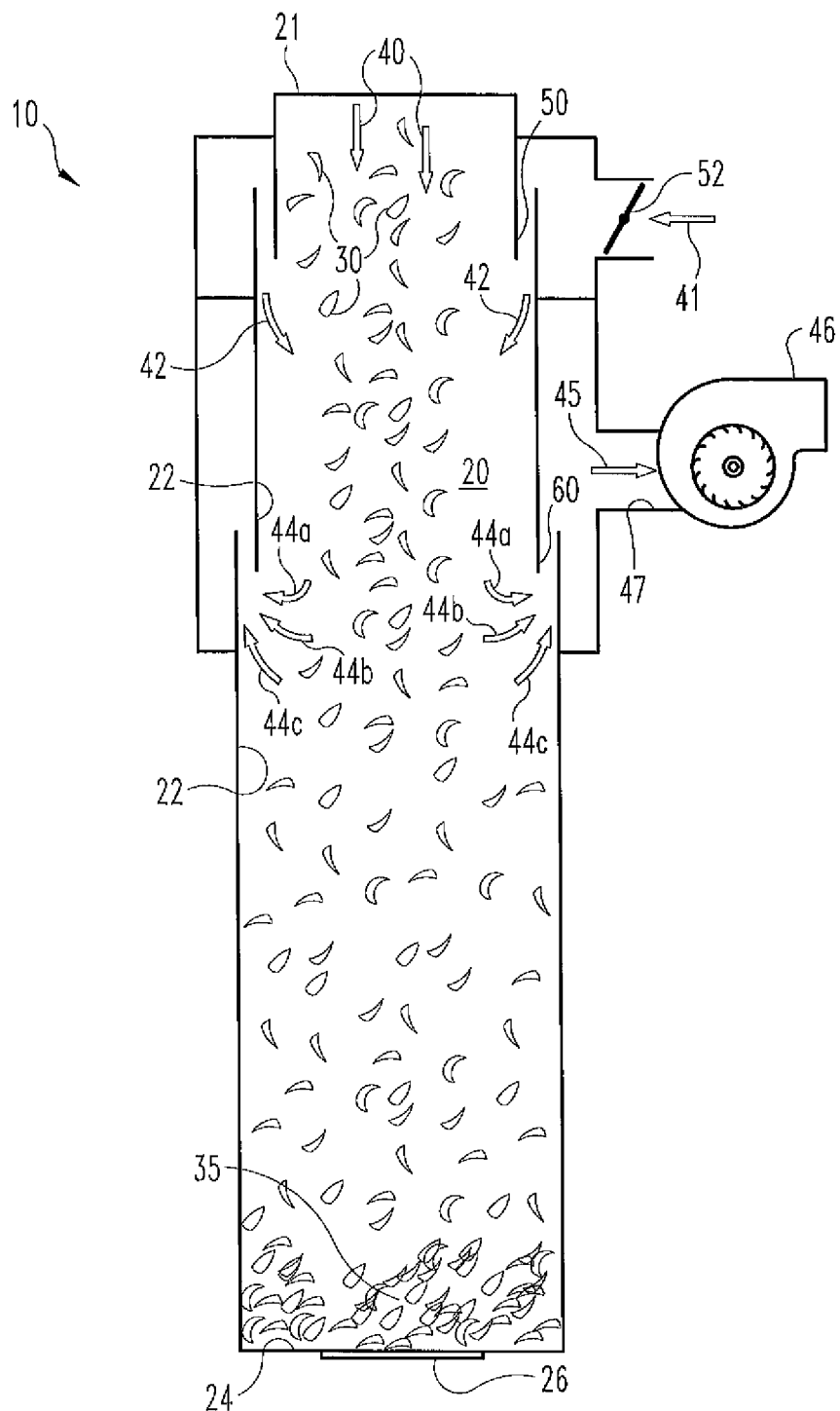

FILTERLESS MATERIAL SEPARATOR

BACKGROUND OF THE INVENTION

1. Field of the Invention

This invention relates to the field of separators for separating lightweight foreign material from air.

2. Description of the Prior Art

One of the major problems in the industrial air handling business is the separation of air from lightweight particulate, mist, or other foreign material. In many manufacturing processes, scrap material is created and is conveyed with air to a central storage area by means of a cyclone or centrifugal separator. In the fiberglass industry, for example, loose fiberglass is exhausted through ducting to cyclone pre-cleaners. These cyclone pre-cleaners have discharge rotary locks and are probably no more than 85% efficient. Air from the cyclone pre-cleaners is then exhausted to cartridge high efficiency after-filters and then to the system fan. Reported maintenance of these system components is quite high. In one industrial facility, the cyclone pre-cleaners are fabricated from ¼ inch steel plate and are replaced on a two-year schedule. Also, the rotary lock seals are replaced on a continual basis with frequent rotary lock housing replacements. In addition to the pre-cleaner maintenance problems, the after-filters require manual removal of the glass fiber from between the filters with a compressed air wand on a daily basis. Disclosed herein is a separator that achieves the desired separation of lightweight foreign material from air without the use of filters and the concomitant wear and replacement of pre-cleaners and after-filters.

SUMMARY OF THE INVENTION

One embodiment of the present invention is an apparatus for separating foreign material from air comprising a chamber with an inlet for receiving the foreign material and air, an exhaust port for exhausting air from the chamber, and an air inlet for allowing an additional quantity of air into the chamber in order to move the foreign material away from the interior walls of the chamber and away from the exhaust port. A pressure source draws the exhaust air from the chamber through the exhaust port. A valve regulates the quantity of additional air that enters the chamber through the air inlet in order to provide sufficient air to move the foreign material away from the exhaust port so that it is not entrained in the exhaust air.

Another embodiment of the present invention comprises a chamber for receiving foreign material and air, means for exhausting air from the chamber, and means for air to flow into the chamber for centering the foreign material in the chamber away from the inner wall surface of the chamber and away from the means for exhausting air from the chamber. Additionally, the means for exhausting air from the chamber is positioned downstream of the means for centering the foreign material in the chamber.

A further embodiment of the present invention comprises chamber means for receiving foreign material and air, air exhaust means for exhausting air from the chamber means, and air inlet means located between the inlet of the chamber means and the air exhaust means. The air inlet means introduces additional air into the chamber means to move the foreign material away from the air exhaust means so that the foreign material is not entrained in the air exhaust means.

A still further embodiment of the present invention is a method of separating foreign material from air comprising the steps of providing a chamber for receiving the foreign material and air, drawing an additional quantity of air into the chamber through an air inlet to move the foreign material in the chamber away from the inner wall surface of the chamber, and exhausting the air from the chamber without entraining the foreign material in the exhaust air. The method further includes collecting the foreign material at the receiving end of the chamber, and discharging the foreign material from the chamber.

It is an object of the present invention to provide a new and improved separator for separating lightweight foreign material from air.

A further object of the present invention is to provide a new and improved method for separating lightweight foreign material from air without using filters.

Related objects and advantages of the present invention will be apparent in the following description.

BRIEF DESCRIPTION OF THE DRAWINGS

FIG. 1 is a longitudinal cross-sectional view of an embodiment of the present invention.

DESCRIPTION OF THE PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Referring now more particularly to FIG. 1, there is shown an apparatus or separator 10 for separating foreign material from air. Separator 10 includes a chamber 20 which has foreign material inlet 21, inner wall surface 22, and receiving end 24 for collecting the foreign material.

Chamber 20 receives a quantity of foreign materials 30 and air through chamber inlet 21. Chamber 20 may be oriented substantially vertically such that foreign material 30 falls through chamber 20 under the influence of gravity. Alternatively, chamber 20 may be oriented substantially horizontally and foreign material 30 may be blown into and through chamber 20 by some external pressure source. As one of skill in the art would recognize, chamber 20 may, thus, have any orientation between vertical and horizontal such that foreign material 30 flows through chamber 20 via some force or combination of forces.

Separator 10 also includes exhaust port 60 which is in fluid communication with chamber 20. A conventional pressure source or blower 46 is connected to exhaust port 60 by conduit 47 such that exhaust air 45 is drawn from chamber 20 through exhaust port 60 by blower 46.

Separator 10 further includes valve 52 and air inlet 50 which is located between foreign material inlet 21 and exhaust port 60. Air inlet 50 is in fluid communication with chamber 20. Valve 52 permits a quantity of air to enter chamber 20 through air inlet 50.

In use of separator 10, a quantity of foreign material 30 and air enters chamber 20 through foreign material inlet 21 in the general direction of arrow 40. Although foreign material 30 is illustrated in FIG. 1 as being distributed relatively uniformly across the cross-section of chamber 20, such uniform distribution is not required. Foreign material 30 then proceeds downstream, moving through chamber 20 under some external force, such as gravity or air pressure as previously described. Due to negative pressure at chamber inlet 21 due to chamber inlet losses, a controlled amount of air is drawn in the direction of arrow 41 past valve 52, through air inlet 50, and into chamber 20. It is also possible to use an air fan to force air in the direction of arrow 41 and into chamber 20. Air enters chamber 20 through air inlet 50 in the direction of arrows 42. The air entering chamber 20 through air inlet 50 forces foreign material 30 toward the center of chamber 20. With foreign material 30 more nearly centered in chamber 20, the kinetic energy of the material carries it further downstream and further away from exhaust port 60 where air turns in the direction of arrows 44a, 44b and 44c and is exhausted through exhaust port 60 by means of pressure source or blower 46.

Valve 52 regulates the amount of air entering chamber 20 through air inlet 50 in order to move foreign material 30 away from chamber inner wall surface 22 and thus away from exhaust port 60 so as not to be entrained in exhaust air 45. Foreign material 30 continues through chamber 20 until it reaches dead airspace at chamber receiving end 24 where collected foreign material 35 comes to rest. The velocity of up-drafting air in the direction of arrow 44c is insufficient to re-entrain collected foreign material 35 into exhaust air 45. Separator 10 may optionally include valve 26, such as a compression seal type valve, at chamber receiving end 24, Valve 26 could cycle to discharge collected foreign material 35 from chamber 20.

Chamber 20 may have any cross-sectional shape, such as square, rectangular, polygonal, circular, or elliptical, and it may be constructed from any suitable non-porous material, such as stainless steel or other metal, ceramic, or plexi-glass. In a preferred embodiment, chamber 20 is substantially cylindrical and air inlet 50 as well as exhaust port 60 are annular surrounding chamber 20. Additionally, as one skilled in the art would appreciate, while air inlet 50 and exhaust port 60 are illustrated in FIG. 1 as opening stream wise into chamber 20, they could alternatively open perpendicular to the flow stream. For example, instead of turning the exhaust air approximately 180° as shown by arrows 44, and in particulars arrows 44a, in FIG. 1, exhaust port 60 could be oriented to turn the exhaust air approximately 90°.

The present invention contemplates means for exhausting air from chamber 20 without the use of a filter by using means for air to flow into chamber 20 for centering foreign material 30 in chamber 20 such that foreign material 30 moves away from chamber inner wall surface 22 and away from the air exhausting means. The exhausting means is positioned downstream of the centering means. The present invention may further include means for discharging collected foreign material 35 from chamber 20.

The method of separating foreign material from air includes the steps of providing a chamber for receiving the foreign material and air, drawing an additional quantity of air into the chamber through an air inlet to move the foreign material in the chamber away from the inner wall surface of the chamber, and exhausting the air from the chamber without entraining the foreign material in the exhaust air. The method further includes collecting the foreign material at the receiving end of the chamber, and discharging the foreign material from the chamber.

The present invention has many different practical application. For example, the separator may be used in place of the cyclone pre-cleaners in the fiberglass industry. It may also be used as a spark trap, collecting sparks created during welding processes. Other materials which have been separated using the present invention include paper punches or cutouts, plastic bags, sand, dirt, food particles, and yarn or fabric trimmings.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. An apparatus for separating foreign material from air by limiting flow of foreign material from a chamber via its air exhaust port comprising: a container forming a cylindrical chamber having a foreign material inlet end for introducing foreign material and air into said chamber, and an opposite end for the collection of the foreign material within the chamber, said chamber including a side wall having an offset cylindrical portion thereof extending in a direction from said inlet end toward said opposite end; an annular air exhaust port located between said inlet end and said opposite end in fluid communication with said chamber; a pressure source that draws exhaust air from said chamber through said exhaust port; an annular air inlet between said foreign material inlet end and said exhaust port with said air inlet separate from said foreign material inlet end and in fluid communication with said chamber and through which a quantity of incoming additional air enters said chamber, said air inlet oriented and opening toward said exhaust port each of which extends through said side wall to direct said incoming additional air onto and away from said side wall moving said foreign material away from said side wall and apart from said exhaust port positioned on the side wall; and a valve to regulate said quantity of additional air entering said chamber; and wherein: said air inlet forms on the inner side of said offset cylindrical portion and said air exhaust port forms on the outer side of said offset cylindrical portion.

2. The apparatus of claim 1 further comprising:
a valve at said opposite end of said chamber for discharging the foreign material from said chamber.

3. An apparatus for separating foreign material from air by limiting flow of foreign material from chamber means having an air exhaust means comprising: cylindrical chamber means including a foreign material inlet for receiving foreign material and air and further including an interior surface and having an offset cylindrical portion; air exhaust means in fluid communication with said chamber means for exhausting air from said chamber means and being located on said interior surface; a pressure source that draws exhaust air from said chamber means through said air exhaust means and said foreign material inlet; and, air inlet means located between said foreign material inlet of said chamber means and said air exhaust means, said air inlet means being in fluid communication with said chamber means and located to open in a direction toward said air exhaust means for introducing additional air into said chamber means and onto and away from said interior surface to move the foreign material away from said interior surface of said chamber means and away from said air exhaust means located on said interior surface so that the foreign material is not entrained in said air exhaust means; and a valve to regulate said additional air entering said chamber means via said air inlet means; and wherein; and wherein: said air inlet means forms on the inner side of said offset cylindrical portion and said air exhaust means forms on the outer side of said offset cylindrical portion.

* * * * *